(12) United States Patent
Moran et al.

(10) Patent No.: US 7,418,210 B2
(45) Date of Patent: Aug. 26, 2008

(54) PROGRAMMABLE TRANSITION TIME ADJUSTMENT MECHANISM

(75) Inventors: Timothy G. Moran, San Jose, CA (US); Greta Light, San Mateo, CA (US)

(73) Assignee: Finisar Corporation, Sunnyvale, CA (US)

( * ) Notice: Subject to any disclaimer, the term of this patent is extended or adjusted under 35 U.S.C. 154(b) by 554 days.

(21) Appl. No.: 10/836,166

(22) Filed: Apr. 30, 2004

(65) Prior Publication Data

US 2005/0196172 A1  Sep. 8, 2005

Related U.S. Application Data

(60) Provisional application No. 60/550,580, filed on Mar. 5, 2004.

(51) Int. Cl.
*H04B 10/04* (2006.01)
(52) U.S. Cl. .................................... 398/195; 372/32
(58) Field of Classification Search ............... 389/195, 389/140; 375/224, 226; 395/128; 327/67, 327/65, 73, 70; 372/32
See application file for complete search history.

(56) References Cited

U.S. PATENT DOCUMENTS 5,796,294 A * 8/1998 Perry .......................... 327/538
2004/0165624 A1 * 8/2004 Stewart et al. ................ 372/32
2004/0240495 A1 * 12/2004 Akamatsu ..................... 372/32
2005/0110476 A1 * 5/2005 Mukherjee et al. .......... 323/313
2005/0132114 A1 * 6/2005 Dybsetter et al. ........... 710/305
2006/0098699 A1 * 5/2006 Sanchez ....................... 372/26

* cited by examiner

*Primary Examiner*—Richard Hjerpe
*Assistant Examiner*—Shaheda A Abdin
(74) *Attorney, Agent, or Firm*—Workman Nydegger

(57) ABSTRACT

An optical transceiver in which one or more bias currents provided to the laser driver are adjusted at cold temperatures such that transition speeds are reduced. A preliminary current generation circuit generates a preliminary current. In addition, a programmable cold temperature bias current compensation circuit draws a configurable amount of current from the preliminary current if the ambient temperature is below a threshold temperature to generate a final current. A laser driver bias current delivery circuit then provides at least one laser driver bias current to the laser driver. These delivered bias currents are dependent at least in part upon the final current. Accordingly, the bias currents provided to the laser current reduce the transition speed of the optical signal at low temperatures, thereby reducing jitter and electromagnetic interference, and allowing user control over the amount of compensation.

25 Claims, 5 Drawing Sheets

PROGRAMMABLE TRANSITION TIME ADJUSTMENT MECHANISM

CROSS-REFERENCE TO RELATED APPLICATIONS

This application claims the benefit of U.S. Provisional Application No. 60/550,580 filed Mar. 5, 2004, which is incorporated herein by reference in its entirety.

BACKGROUND OF THE INVENTION

1. The Field of the Invention

The present invention relates generally to high speed telecommunications systems. More particularly, embodiments of the present invention relate to mechanisms for adjusting the rise and fall time in a laser transceiver while allowing for user configurability of the transition times even without the aid of an external controller.

2. Background and Relevant Art

Many high speed data transmission networks rely on optical transceivers and similar devices for facilitating transmission and reception of digital data embodied in the form of optical signals. Typically, data transmission in such networks is implemented by way of an optical transmitter, such as a laser, while data reception is generally implemented by way of an optical receiver, an example of which is a photodiode.

When employing a laser, the optical transmitter includes a laser driver. The laser driver controls the operations of the laser to properly convert electronic signals to optical signals for transmission over an optical network. The optical signal as transmitted is represented in digital form with a logical one often being represented by a higher optical intensity, and with a logical zero often being represented by a much lower optical intensity. In order to transmit a sequence of binary bits, it is often necessary for the optical signal to transition from the low optical intensity to the high optical intensity, and from a high optical intensity to a low optical intensity as appropriate given the information represented by the optical signal sequence.

The transition speed of the laser driver and the laser are greatly affected by temperature. Specifically, the transition speed tends to increase with colder temperatures. If the transition speed is too high, however, there can be several undesirable effects.

For example, if the optical signal transitions too quickly from high to low, the optical signal may undershoot the low optical intensity used to represent the logical zero (hereinafter also referred to as the "standard low optical intensity"). This increases the amount of time needed for the optical signal to settle to the standard low optical intensity. If the optical intensity undershoots too far, the laser may even turn off thereby significantly increasing the settling time. If the next transition from low to high is not within this settling time, the optical intensity may be above or below the standard low optical intensity. This means that next transition from low to high may occur sooner or later than desired. Accordingly, jitter is introduced into the optical signal sequence.

If the optical signal transitions too quickly from low to high, the optical signal may overshoot the high optical intensity used to represent the logical one (hereinafter also referred to as the "standard high optical intensity"). Once again, settling time is increased thereby introducing the potential for jitter.

The overshoot and undershoot problems discussed above may also have other undesirable effects. For example, before the electrical signal is converted into the optical signal, the overshoot and undershoot may causes electromagnetic interference to emit to the rest of the laser driver and telecommunications system, thereby potentially adversely affecting the performance of the telecommunications system as a whole.

Therefore, what would be advantageous are mechanisms in which the transition speed of the signal may be adjusted to reduce or eliminate overshooting and undershooting to thereby reduce jitter and electromagnetic interference. If would further be advantageous if this adjustment would permit a user to program the transition speed in response to empirical observations of the actual telecommunications system and depending on the sensitivity of the telecommunications system and network to jitter and electromagnetic interference. Furthermore, it would be advantageous if such a programmable transition time mechanism could be implemented without the use of an external controller thereby reducing the cost of the optical transceiver and associated telecommunications system.

BRIEF SUMMARY OF THE INVENTION

The foregoing problems with the prior state of the art are overcome by the principles of the present invention which are directed towards an optical transceiver. The optical transceiver includes a laser driver. The laser driver drives a laser diode with a signal sequence. The speed of transition of the signal sequence tends to reduce as a bias current provided to the laser driver is reduced, and tends to increase as the bias current is increased.

In accordance with the principles of the present invention, the optical transceiver protects against undershooting and overshooting of the optical signal by imposing a reduction in transition speed at low temperatures. Specifically, a preliminary current generation circuit generates a preliminary current. In addition, a programmable cold temperature bias current compensation circuit draws a configurable amount of current from the preliminary current if the ambient temperature is below a threshold temperature to generate a final current. A laser driver bias current delivery circuit then provides at least one laser driver bias current to the laser driver. These delivered bias currents are dependent at least in part upon the final current.

Accordingly, the principles of the present invention allow for a reduction of transition speed at cold temperatures thereby reducing or eliminating overshoot and undershoot. This, in turn, reduces jitter and electromagnetic interference. Furthermore, the user may program how much transition speed reduction occurs at cold temperatures. Finally, as will be explained below, the preliminary current generation circuit, the programmable cold temperature bias current compensation circuit, and the laser driver bias current delivery circuit may be integrated on the same chip as the laser driver. Accordingly, cold temperature transition time adjustment may occur even without the assistance of an external controller.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to an optical transceiver in which one or more bias currents provided to the laser driver are adjusted at cold temperatures such that transition speeds are reduced at cold temperatures. This reduces overshoot and undershoot of the optical signal during signal transitions thereby reducing jitter and electromagnetic interference. The optical transceiver also allows the amount of transition speed adjustment to be configurable and even to be performed without the aid of an external controller.

Figure 1:
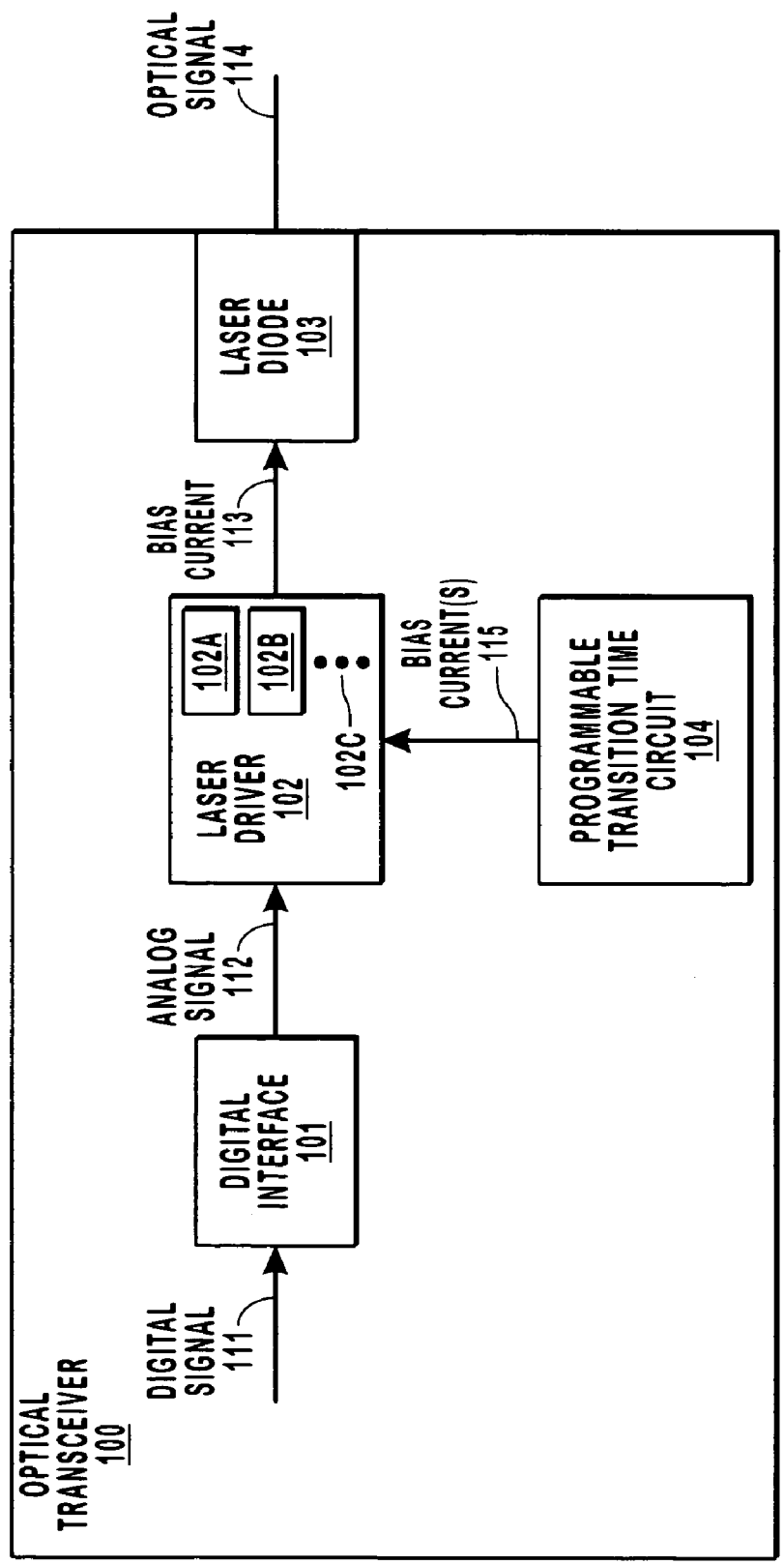
FIG. 1 schematically illustrates an optical transceiver that includes a programmable transition time circuit that adjusts the transition speed of the laser driver.

Turning to the drawings, FIG. 1 illustrates an optical transceiver 100, which operates to transmit outgoing optical signals. In order to transmit, the optical transceiver 100 converts a digital signal 111 to an analog signal sequence 112 using a digital interface circuit 101. The laser driver 102 then drives and modulates a bias current 113 on the laser diode 103 in such a way that the laser diode emits an optical signal 114 that includes the information represented by the digital signal 111.

Figure 2:
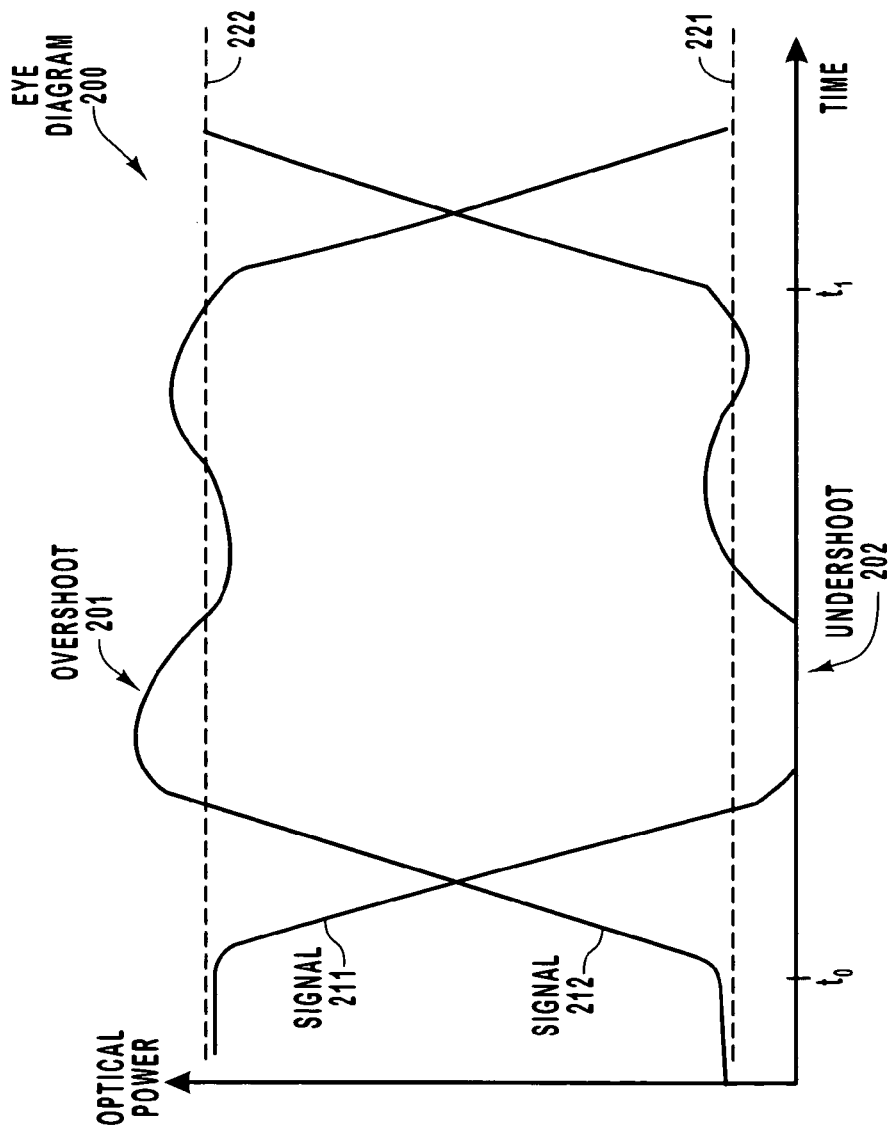
FIG. 2 illustrates an eye diagram showing overshoot and undershoot problems present in accordance with the prior art.

As is common with laser drivers, the laser driver 102 tends to transition faster at lower temperatures and slower at higher temperatures. The laser diode 103 likewise transitions faster at lower temperatures, and slower at higher temperatures. Accordingly, transitions occur especially rapidly at low temperatures. FIG. 2 illustrates an eye diagram 200 that may be characteristic of conventional optical transmitters. The eye diagram plots the power versus time characteristics of two differential signals 211 and 212. At time t0, the signal 211 transitions from high to low. At low temperatures, the signal transitions quickly such that the signal 211 undershoots 202 the standard low optical intensity 221. Similarly, a time t0, the signal 212 transitions quickly from low to high to thereby overshoot 201 the standard high optical intensity 222. As mentioned above, such overshoot 201 and undershoot 202 tends to increase jitter and electromagnetic interference. Similar overshooting and undershooting occurs at time t1.

In order to reduce or eliminate this overshoot and undershoot, the optical transceiver 100 includes a programmable transition time circuit 104 that allows the transition time to be slowed considerably when experiencing low temperatures. This slowing reduces or eliminates the overshoot and undershoot problems. In order to do so, the programmable transition time circuit 104 provides one or more appropriate bias currents 115 to the laser driver 102 to accomplish this slower transition. For example, one bias current may be provided to one portion 102A of the laser driver 102, while another bias current may be provided to another portion 102B of the laser driver 102. These portions 102A and 102B affect the transition time depending on the bias current provided thereto. In one example, the first portion 102A may be a laser pre-driver, while the second portion 102B may represent a transition acceleration circuit. The laser driver 102 may include other components 102C which may affect the transition speed depending on the bias current(s) provided by the programmable transition time circuit 104.

Figure 3B:
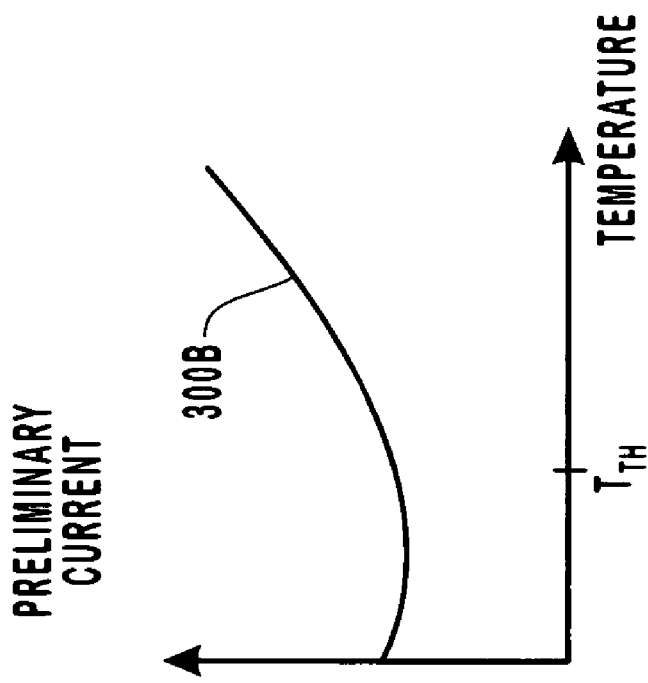
FIG. 3B illustrates another current profile for another preliminary current.
Figure 3A:
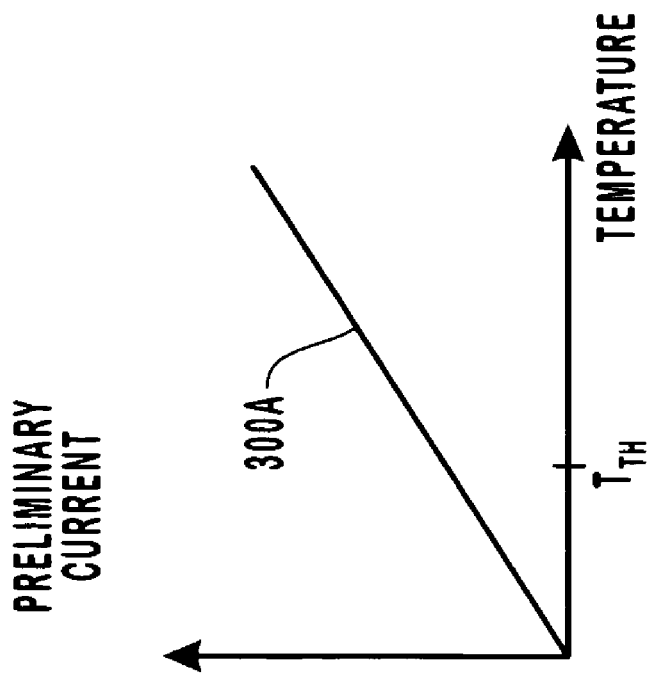
FIG. 3A illustrates a Proportional-To-Absolute Temperature (PTAT) current which represents one example of a preliminary current.
Figure 4:
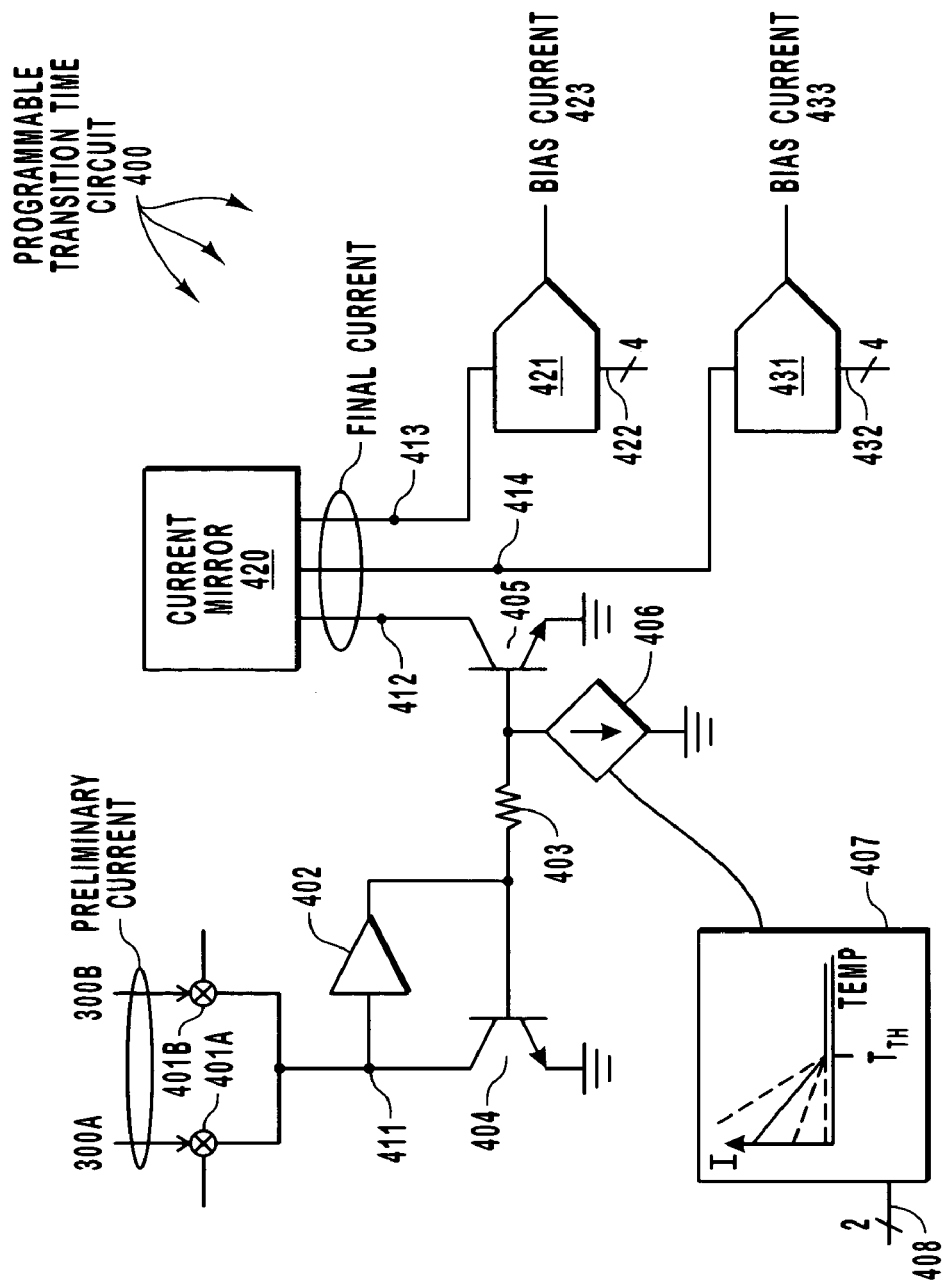
FIG. 4 illustrates an example of the programmable transition time circuit of FIG. 1 in further detail.
Figure 5B:
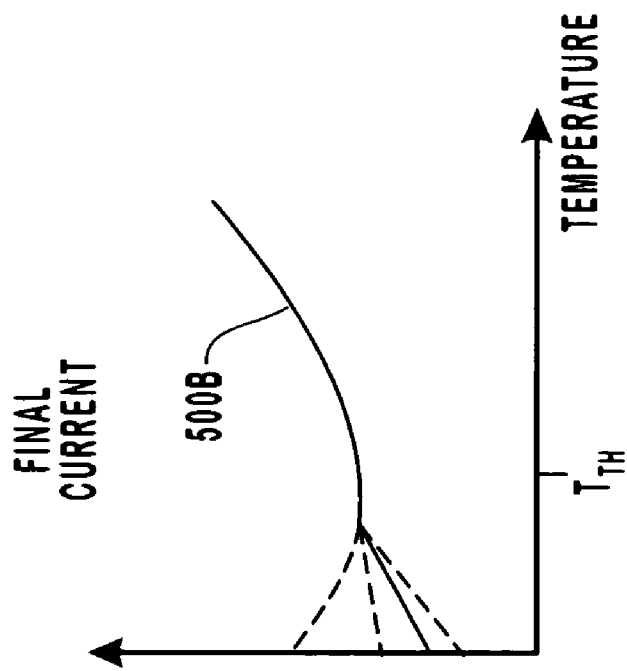
FIG. 5B illustrates a final current profile generated from the preliminary current of FIG. 3B.
Figure 5A:
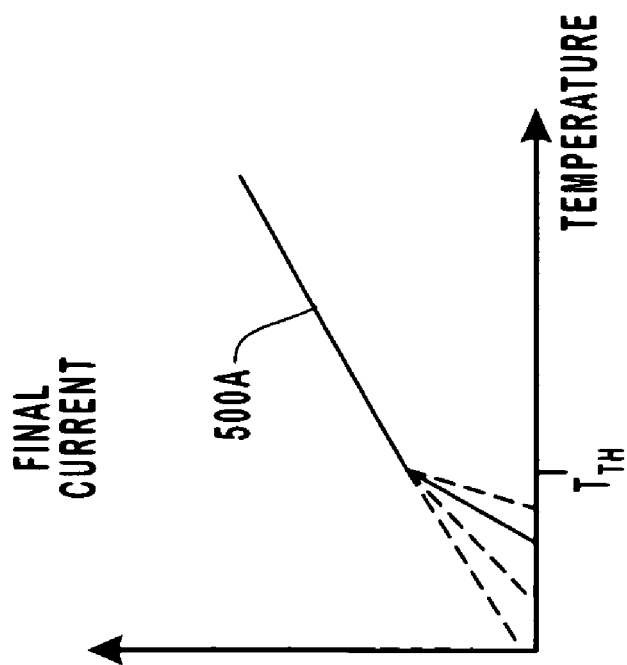
FIG. 5A illustrates a final current profile generated from the preliminary current of FIG. 3A.

FIG. 4 illustrates a programmable transition time circuit 400 that represents an example of the programmable transition time circuit 104 of FIG. 1. The transition time circuit 400 receives two preliminary currents 300A and 300B. FIG. 3A illustrates a current versus temperature profile for an example preliminary current. Specifically illustrated is a Proportional-To-Absolute-Temperature (PTAT) current profile 300A. Alternatively, a different temperature profile 300B such as that illustrated in FIG. 3B may be used instead. The laser driver is configured such that the transition speed of the signal sequence tends to reduce as the bias current(s) provided to the laser driver is reduced, and tends to increase as the bias current is increased. Accordingly, the preliminary currents may be used without modification as the bias current since they tend lower with lower temperatures. However, the programmable transition time circuit has further capability to slow transition times at cold temperatures.

Referring again to FIG. 4, one of the preliminary currents 300 is provided to node 411 through a corresponding switch 401. For example, if the switch 401A is closed, the preliminary current 300A is provided to the node 411. Alternatively, if the switch 401B is closed, the preliminary current 300B is provided to the node 411. The bipolar transistors 404 and 405 are configured as current mirrors with a resistor 403 also provided. Furthermore, a buffer 402 is provided for isolation purposes. In this mirror configuration, whichever of the preliminary currents 300 is provided to node 411 is mirrored through the base emitter region of the bipolar transistor 405. The components 401, 402, 403, 404 and 405 thus serve as a preliminary current generation circuit.

In order to provide additional configurable slow down of transition speed during low temperatures, a programmable cold temperature bias current compensation circuit is provided. Specifically, a current drain 406 having the current-temperature profile 407 is provided. Referring to the temperature profile 407, the current is relatively constant for temperatures above a threshold temperature $T_{TH}$. However, depending on further configuration data 408 which may be user set, there is a different temperature profile below this threshold temperature. Under one configuration setting referred to herein as the "null configuration", the temperature profile remains unchanged even at low temperatures. Under the other configuration settings, there are varying levels of increase as temperature decreases. Accordingly, below the threshold temperature, the level of current drawn by the current sink 406 will be different for each configuration setting 408, with the level of current being negligible for the null configuration.

Drawing current through the current sink 406 reduces the current at node 412 below the preliminary current to generate a final current at node 412. This final current is mirrored using current mirror 420 to nodes 413 and 414. The programmable transition time circuit 400 also includes a series of one or more laser driver bias current delivery circuits. Specifically illustrated are delivery circuits 421 and 431. Each of the current delivery circuits generates a bias current whose magnitude is dependent upon the final current provided as well as potentially a configuration setting provided to the delivery circuit. For example, the delivery circuit 421 receives the final current and uses that final current to generate a bias current 423 having a magnitude depending on the magnitude of the final current and upon the configuration settings 422. The delivery circuit 431 receives the final current and uses that final current to generate a bias current 433 having a magnitude depending on the magnitude of the final current and upon the configuration settings 432. These bias currents 423 may then be provided as bias currents 115 to appropriate portions of the laser driver 102 to thereby reduce transition speeds, especially for colder temperatures. In one embodiment, the configuration settings 422 and 432 are the same although this need not be the case.

Accordingly, the principles of the present invention provide an optical transceiver in which the transition speed is lessened at colder temperatures to thereby reduce or eliminate the overshooting and undershooting that causes jitter and electromagnetic interference. Furthermore, there are various points of configurability in the transition time circuit. This permits a user to program the transition speed in response to empirical observations of the actual telecommunications system and depending on the sensitivity of the telecommunications system and network to jitter and electromagnetic interference. Furthermore, each of the components may be integrated within the same chip as the laser driver and need not access external memory in order to operation. Therefore, the configurable transition speed adjustment may occur even without an external controller.

It should be noted that while some embodiments of the invention are well-suited for use in conjunction with a high speed data transmission system conforming to the Gigabit Ethernet ("GigE") physical specification, such operating environment is exemplary only and embodiments of the invention may, more generally, be employed in any of a variety of high speed data transmission systems, some of which may have line rates up to, or exceeding, 1 G, 2.5 G, 4 G, 10 G and higher bandwidth fiber channels. For example, some embodiments of the invention are compatible with the Fibre Channel ("FC") physical specification.

Further, embodiments of the invention may be implemented in various ways. By way of example, some embodiments of the PA/LD are implemented in Small Form Factor Pluggable ("SFP") bi-directional transceiver modules. Such transceiver modules are configured for GigE and/or FC compliance. Exemplarily, such transceiver modules are capable of transmitting and/or receiving at a wavelength of about 850 nm. Moreover, these transceiver modules can operate over a wide range of temperatures. For example, some of such transceiver modules are effective over a temperature range of about 80° C., such as from about −10° C. to about +70° C. Of course, such embodiments and associated operating parameters are exemplary only, and are not intended to limit the scope of the invention in any way. For example, the principles of the present invention may be implemented in laser transmitter/receivers of any form factor such as XFP, SFP and SFF, without restriction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. An optical transceiver comprising the following:
    a laser driver configured to drive a laser diode with a signal sequence, wherein the laser driver is configured such that a speed of transition of the signal sequence tends to reduce as a bias current provided to the laser driver is reduced, and tends to increase as the bias current is increased;
    a preliminary current generation circuit for generating a preliminary current;
    a programmable cold temperature bias current compensation circuit configured to draw a configurable amount of current from the preliminary current if the ambient temperature is below a threshold temperature to generate a final current; and
    a laser driver bias current delivery circuit configured to provide at least one laser driver bias current to the laser driver that is dependent at least in part upon the final current.

2. An optical transceiver in accordance with claim 1, wherein the laser driver includes a first portion, wherein the laser driver bias current delivery circuit includes a first bias current delivery circuit configured to provide a first bias current to the first portion that is dependent at least in part upon the final current.

3. An optical transceiver in accordance with claim 2, wherein the first bias current is further dependent upon a configuration setting provided to the first bias current delivery circuit.

4. An optical transceiver in accordance with claim 3, wherein the laser driver includes a second portion, wherein the laser driver bias current delivery circuit includes a second bias current delivery circuit configured to provide a second bias current to the second portion that is dependent at least in part upon the final current, the second bias current being different than the first bias current.

5. An optical transceiver in accordance with claim 4, wherein the second bias current is further dependent upon the configuration setting provided to the first bias current delivery circuit.

6. An optical transceiver in accordance with claim 4, wherein the configuration setting is a first configuration setting, wherein the second bias current is further dependent upon a second configuration setting provided to the second bias current delivery circuit.

7. An optical transceiver in accordance with claim 2, wherein the laser driver includes a second portion, wherein the laser driver bias current delivery circuit includes a second bias current delivery circuit configured to provide a second bias current to the second portion that is dependent at least in part upon the final current, the second bias current being different than the first bias current.

8. An optical transceiver in accordance with claim 7, wherein the first portion is a transition acceleration integrated circuit.

9. An optical transceiver in accordance with claim 8, wherein the second portion is a laser pre-driver.

10. An optical transceiver in accordance with claim 7, wherein the first portion is a laser pre-driver.

11. An optical transceiver in accordance with claim 1, wherein the preliminary current is a Proportional-To-Absolute Temperature (PTAT) current.

12. An optical transceiver in accordance with claim 1, wherein the preliminary current is set by a setting that is a function of temperature.

13. An optical transceiver in accordance with claim 1, wherein the preliminary bias generation circuit is configurable to generate the preliminary current as either a Proportional-To-Absolute Temperature (PTAT) current or another current profile.

14. An optical transceiver in accordance with claim 1, wherein the programmable cold temperature bias current compensation circuit has a configuration setting in which the programmable cold temperature bias current draws no current from the preliminary current such that the preliminary current is the final current even for temperatures below the threshold temperature.

15. An optical transceiver in accordance with claim 14, wherein the programmable cold temperature bias current compensation circuit has a configuration setting in which the programmable cold temperature bias current draws a first current from the preliminary current to generate the final current when at a given temperature below the threshold temperature.

16. An optical transceiver in accordance with claim 15, wherein the programmable cold temperature bias current compensation circuit has a configuration setting in which the programmable cold temperature bias current draws a second current from the preliminary current to generate the final current when at the given temperature below the threshold temperature, the second current being different in magnitude than the first current.

17. An optical transceiver in accordance with claim 14, wherein the programmable cold temperature bias current compensation circuit has a first configuration setting in which the programmable cold temperature bias current draws a first current from the preliminary current to generate the final current when at a given temperature below the threshold temperature, and wherein the programmable cold temperature bias current compensation circuit has a second configuration setting in which the programmable cold temperature bias current draws a second current from the preliminary current to generate the final current when at the given temperature below the threshold temperature, the second current being different in magnitude than the first current.

18. An optical transceiver in accordance with claim 1, wherein the optical transceiver is a 1 G laser transceiver.

19. An optical transceiver in accordance with claim 1, wherein the optical transceiver is a 2.5 G laser transceiver.

20. An optical transceiver in accordance with claim 1, wherein the optical transceiver is a 4 G laser transceiver.

21. An optical transceiver in accordance with claim 1, wherein the optical transceiver is a 10 G laser transceiver.

22. An optical transceiver in accordance with claim 1, wherein the optical transceiver is a laser transceiver suitable for fiber channels greater than 10 G.

23. An optical transceiver in accordance with claim 1, wherein the optical transceiver is an XFP laser transceiver.

24. An optical transceiver in accordance with claim 1, wherein the optical transceiver is an SFP laser transceiver.

25. An optical transceiver in accordance with claim 1, wherein the optical transceiver is an SFF laser transceiver.

* * * * *